May 23, 1950     A. C. NEWMAN ET AL     2,508,647
RESTRICTOR SWIVEL FOR FOLDING WING AIRCRAFT
Filed June 2, 1947     2 Sheets-Sheet 1

INVENTORS
Arnold C. Newman
John W. Woodward

M. B. Tasker
ATTORNEY

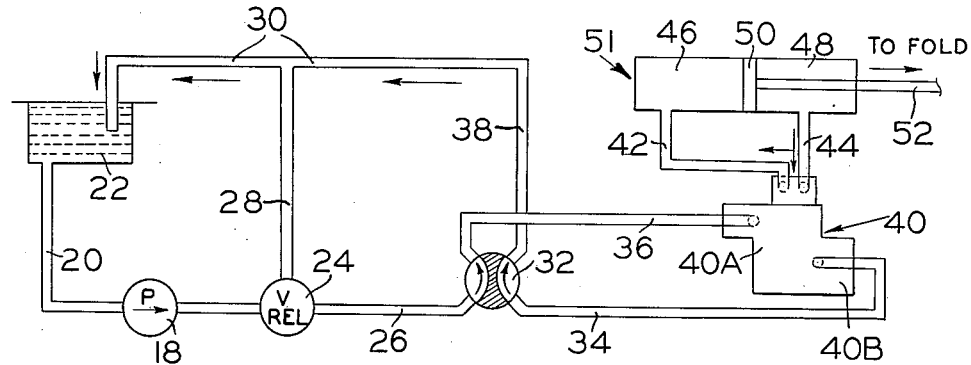
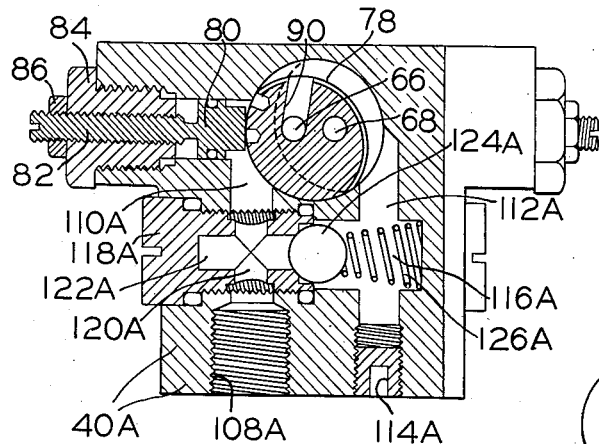
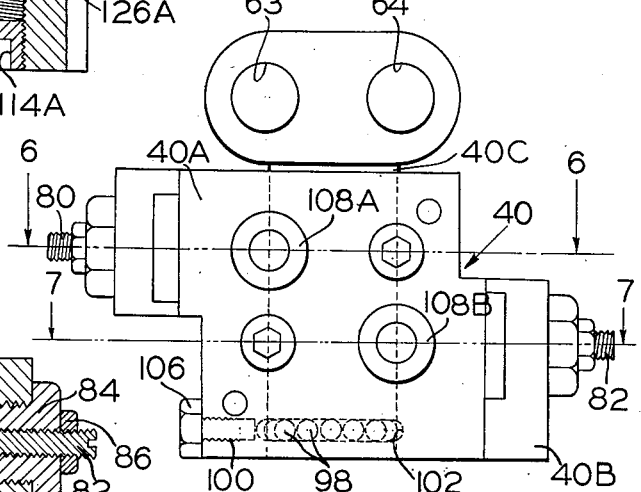
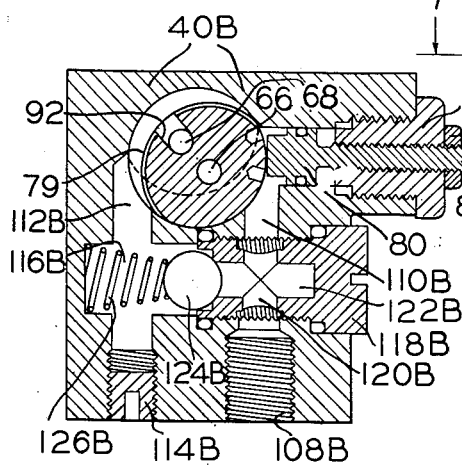

Patented May 23, 1950

2,508,647

UNITED STATES PATENT OFFICE 2,508,647

RESTRICTOR SWIVEL FOR FOLDING WING AIRCRAFT

Arnold C. Newman and John W. Woodward, Stratford, Conn., assignors to United Aircraft Corporation, East Hardford, Conn., a corporation of Delaware Application June 2, 1947, Serial No. 751,844

6 Claims. (Cl. 244—49)

This invention relates to aircraft such, for example, as are commonly based on aircraft carrying vessels, in which the wings, or outer panels thereof, have cordwise hinges and are moved between folded and extended positions by hydraulically actuated mechanism.

In the use of aircraft of this type, for example, in the operation of a carrier based fleet of fighter airplanes, it is often extremely important to be able to unfold the wings in the shortest possible time as each airplane is readied for flight; and likewise when the planes are coming in from a flight in rapid succession it is important to be able to fold the wings and get each plane off the runway quickly following landing to make room for the next incoming plane.

It is an object of this invention to provide an improved foldable wing aircraft in which the time required for folding and extending the wings is materially shortened; and more particularly to provide a folding wing actuating mechanism for an airplane of this type which moves the movable wing section through the major part of its path of movement at a high rate of speed and decelerates it to permit it to come to rest gently at the end of its movement.

Another object of the invention is to provide an improved restrictor valve having its movable member operatively connected to the movable section of the airplane wing and controlling the flow of fluid to the wing actuating strut.

A further object of the invention is to provide an improved restrictor-swivel in the hinge for the foldable section of an airplane wing having improved fluid controlling mechanism therein for governing the flow of fluid to the hydraulic wing actuating strut.

These and other objects of the invention will be hereinafter pointed out or will become apparent from the following detailed description of one embodiment of the invention which has been shown for purpose of illustration in the accompanying drawings.

In these drawings,

Fig. 5 is a bottom plan view of the valve of Fig. 2;

Fig. 6 is a true sectional view on line 6—6 of Fig. 5;

Fig. 7 is a sectional view taken on line 7—7 of Fig. 5 showing the valve member in the position it occupies when the outer wing panel is folded; and Fig. 8 is a diagrammatic view of the hydraulic system for effecting the folding and unfolding of the outer wing panel.

Figure 2:
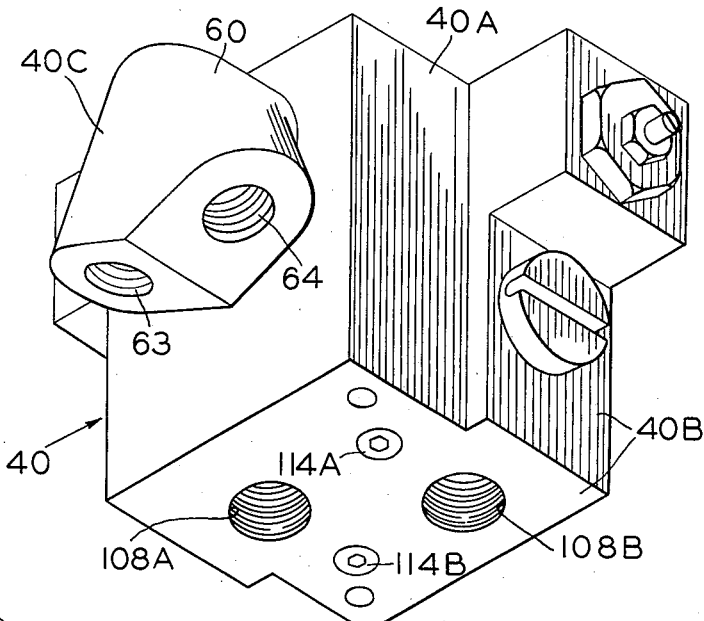
Fig. 2 is a perspective view of a restrictor-swivel valve for controlling the flow of hydraulic fluid to the wing actuating strut, the movable valve member being shown in the position it occupies when the wing panel is extended.
Figure 1:
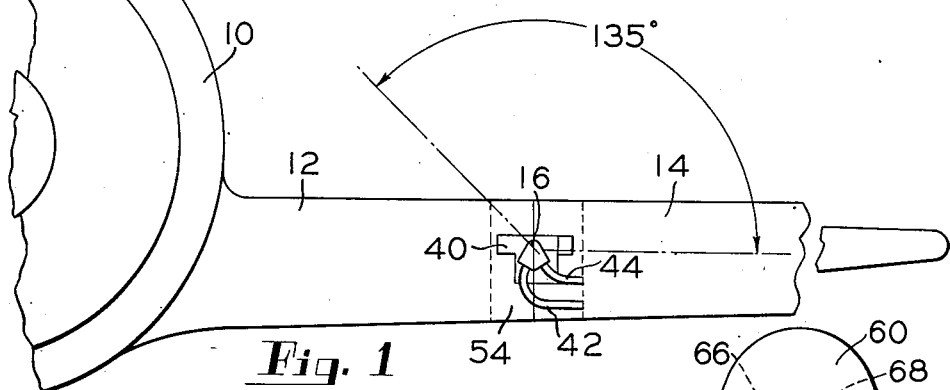
Fig. 1 is a fragmentary view of an airplane having outer folding wing panels, the view being taken looking aft at the left-hand wing with a considerable portion of the outer wing panel broken away.

Referring to Fig. 1, the numeral 10 indicates the fuselage of an airplane having a wing comprising an inner panel 12 rigidly attached to the fuselage and an outer panel 14 which is foldable upwardly from the horizontal position shown about a cordwise hinge line 16 through an angle of 135° into a folded position in which its tip lies over the fuselage. While only the left-hand wing of the airplane has been shown herein it will be understood that the two wings are identical in construction except for their right and left-hand characteristics.

The hydraulic system for actuating the outer wing panel between its horizontal, or extended, position shown in Fig. 1 and its folded position includes the usual constant pressure fluid source comprising the pump 18 receiving fluid through a conduit 20 from a reservoir 22 and discharging through a relief valve 24 into a pressure fluid line 26. Fluid bypassing valve 24 flows through a line 28 into a fluid return line 30 which discharges into the reservoir 22. Fluid under pressure in line 26 passes through a manually controlled two-way selector valve 32 which connects the pressure line 26 to one of two fluid lines 34, 36, depending upon the position of the valve, and simultaneously connects the other line to drain through a fluid line 38. In the position of valve 32 shown in Fig. 8 the pressure line 26 is connected to line 36, and line 34 is connected to drain. The fluid lines 34 and 36 communicate through separate fluid passages in a restrictor-swivel valve 40, hereinafter more fully described, and fluid lines 42 and 44 with fluid chambers 46 and 48 on opposite sides of a piston 50 of a wing actuating hydraulic strut 51, the piston rod 52 of which is mechanically connected with the wing folding actuating linkage for the outer wing panel.

As shown, the restrictor-swivel valve 40 is located in a well 54 between the inner and outer wing panels with the axis of its movable member lying in hinge line 16. It will be evident as the description proceeds that this valve is not necessarily located in the hinge line but could equally well be located, for example, in the inner wing panel 12 remote from the hinge line and be operated by suitable linkage connected with the folding outer wing panel 14.

Figures 3, 4:
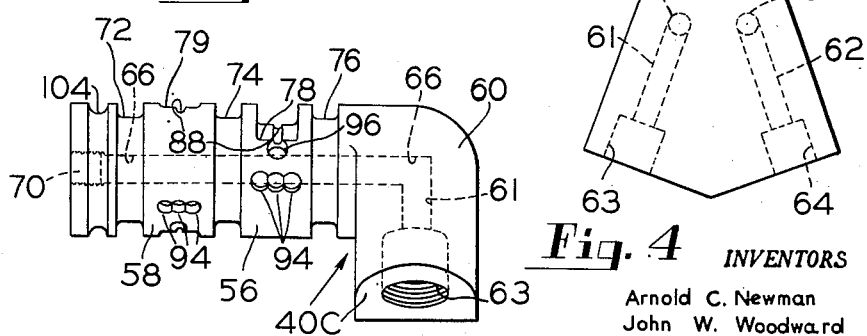
Fig. 3 is a detail view of the movable member of the valve of Fig. 2.
Fig. 4 is an end view of the movable valve member of Fig. 3.

The restrictor-swivel valve 40, as shown most clearly in Fig. 5 and the sections taken thereon, includes two stationary valve bodies 40a and 40b, which are basically the same except for their left and right relationship, and a swivel bolt 40c, shown in detail in Fig. 3, having integral flow controlling valve portions 56 and 58 which cooperate respectively with the valve bodies 40a and 40b to control the rate of flow of fluid through these valve bodies and through fluid lines 42 and 44 leading to the wing strut.

The swivel bolt 40c in addition to the valve stem portion thereof which carries the valve portions 56 and 58 has an external eccentric hood portion 60 provided with diverging fluid passages 61 and 62 terminating in threaded connections 63 and 64 into which the rigid fluid lines 42 and 44 are screw threaded. The axis of rotation of the swivel bolt, as herein shown, is coincident with the hinge line 16 of the wing panel. Accordingly, since the rigid fluid lines 42 and 44 are fixed in the outer wing panel, the swivel bolt 40c is moved through an identical angle as the outer wing panel swings about its hinge line 16. Passages 61 and 62 communicate with parallel channels 66 and 68 which extend along the stem of swivel bolt 40c and are closed off at their ends remote from the hood 60 by screw threaded plugs, one of which is shown at 70 in Fig. 3.

The valve portions 56 and 58 are generally cylindrical and are sealed off by O-ring packings (not shown) located in grooves 72, 74 and 76 which engage the inner bore of the valve housing in a well known manner to prevent fluid communications along the valve stem.

The cylindrical valve portions 56 and 58 have centrally formed eccentric, or cam, portions 78 and 79 respectively which are angularly related about the axis of the stem as indicated in Fig. 3. These cam portions 78 and 79 are in effect wide, generally flat-bottom grooves formed in the cylindrical valve portions which cooperate with the flat faces of pistons 80 having their threaded shanks 82 adjustable in plugs 84 threaded into the valve housing. Lock nuts 86 are provided externally of the plugs 84 on the stems 82 for locking the pistons 80 in a selected position of adjustment relative to the cam surfaces. The grooves formed by the cam portions 78 and 79 in the two valve portions are identical except for position and further include a small central relief groove 88 extending around the cut away periphery of the valve portion which forms the cam. The cam portions 78 and 79 communicate through transverse passages 90 and 92 with channels 66 and 68 respectively. Also at a point slightly spaced around the periphery of the valve portion from the passages 90 and 92 a series of holes or depressions 94 arranged along the length of the valve portion, herein three, are provided in the cylindrical valve surface. Nearer the end of groove 88 in the cam portion a similar hole 96 is provided adjacent holes 94 and this latter hole communicates with the groove 88 of its respective cam portion. The purpose of the holes 94, 96 are hereinafter explained. The swivel bolt 40c is retained in the valve housing by a series of balls 98 (Fig. 5) which are introduced through a passage 100 in the valve body 40b and occupy complemental annular grooves 102 and 104 in the housing and valve stem respectively. The hole 100, following insertion of the balls, is closed by a cap screw 106.

Referring to Figs. 5 and 6, the valve body 40a is provided with a threaded fluid connection 108a communicating with a passage 110a in the valve body which intersects the valve stem receiving passage in the housing in the planes of the cam portion 78. A second passage 112a parallel with passage 108a and lying in the same transverse plane is provided on the opposite side of the axis of the valve stem. The outer end of passage 112a is closed by a plug 114a, and the inner end of passage 112a, like passage 110a, intersects the valve stem receiving passage in the housing in the planes of cam portion 78. A transverse passage 116a of somewhat larger diameter intersects the passages 110a, 112a, and has its open end closed by a plug 118a threaded into the valve housing. The plug 118a has a passage 120a which is aligned with passage 110a and also has an axial passage 122a which is smaller than passage 116a in the housing and which intersects passage 120a. The inner end of plug 118a is recessed to provide a seat for a ball check valve 124a which is normally held against the seat by a spring 126a which bears against the ball at one end and against the housing at its other end.

Valve body 40b is identical with the valve body 40a above described except for the reversal in position of the parts, and the corresponding parts have been given like numerals identified by the letter b. It will be understood that the passage 110b and 112b of valve body 40b communicate with the valve portion 58 on the valve stem 40c.

In operation, the outer wing panel 14 as it swings through its 135° of angular movement between its folded and extended positions moves the swivel bolt 40c with it, thus moving the fluid restricting valve portions 56 and 58 relative to the faces of pistons 80 into such positions that the cam in the passage supplying fluid to wing strut 51 allows free passage of fluid to the wing actuating strut throughout the entire movement while the cam in the passage returning fluid from strut 51 at first permits free return of fluid from the strut and then, as the movable wing panel approaches the end of its arc, restricts the path of the returning fluid between the cam surface and the face of the adjustable piston 80. It will be evident that the valve portion 56 in valve body 40a controls the restriction of the return fluid during the extending movement of the wing panel while valve portion 58 in valve body 40b controls the restriction of the return fluid during folding movement of the wing panel.

Fig. 6 shows in full lines the position of the swivel bolt 40c relative to the passages in the valve body 40a when the outer wing panel is in the extended position shown in Fig. 1. To fold the panel 14 the selector valve 32 is moved 90° from the position shown in Fig. 8 to admit fluid under pressure from line 26 through line 36 to the body 40a of the valve. This fluid entering at the connection 108a flows through passage 120a and, since the chamber formed by passage 110a is sealed off by the cylindrical part of valve portion 56 which abuts the face of piston 80, the fluid passes through check valve 124a into passage 112a, about the cam portion 78, and by way of passage 90 and channel 66 in the stem of swivel bolt 40c into the hood portion 60. The fluid then flows through passage 61 and connection 63 to the fluid line 42 and finally into chamber 46 of the wing strut, causing the piston 50 of this strut to actuate the linkage in a direction to raise the panel 14 into folded position.

Throughout this 135° folding movement of the panel, in which the swivel bolt is moving counter-clockwise as viewed in Figs. 6 and 7, the cam portion 78 permits free fluid flow from chamber 46 of the wing strut through fluid line 44, connection 64, passage 62, channel 68, passage 92, around cam 79 to chamber 110b and passage 120b, connection 108b and fluid line 34 to drain. During the first part of this angular movement the flow in valve body 40a will be from passages 120a, 122a through the check valve to passage 112a, around cam portion 78 and out through passage 90 and channel 66 as above described. During the latter part of the folding movement the part of valve portion 56 which is concentric with the swivel bolt will have moved away from the face of piston 80 so as to allow fluid to flow from chamber 110a directly past the piston face and out through the pasage 90 and channel 66. This will be evident from the dotted line position of the cam 78 shown in Fig. 6, which indicates the position of the cam at the end of the folding movement.

During the above described movement of cam 78, cam 79 has been moving from the dotted position counterclockwise into the full line position of this cam shown in Fig. 7. It will be noted that with cam 79 in the dotted position shown in Fig. 7, which represents the position of this cam when the wing panel is in extended position, cam 79 permits free flow of fluid returning from wing strut chamber 46 through passages 44, 64, 62, 68 and 92, into passages 110b, 120b, connection 108b and passage 34. However, near the end of the 135° folding movement of swivel bolt 40c, the flow of fluid is gradually cut off by cam portion 79 and piston 80 and, since the fluid in chamber 112b cannot pass through check valve 124b, as the swivel valve approaches folded panel position (in which the cam 79 is in its full line position in Fig. 7) flow practically ceases and the wing is brought gently to a stop in folded position. It is during this final throttling action of the valve portion that the transverse depressions 96, 94 function. These depressions serve to create a turbulence in the hydraulic fluid as the hydraulic fluid flows past them and, other conditions remaining constant, turbulent fluid does not flow through an orifice as readily as non-turbulent fluid. This helps to make the transition from the condition of flow to the condition of no flow past the restricting surfaces more gradual and smooth.

The operation of the swivel-restrictor valve during the extending movement is the same as that above described except that the fluid flow to the wing strut chamber 46 through valve body 40b is unrestricted by valve portion 58 and the restriction takes place near the end of the extending movement between the face of piston 80 and valve portion 56. The fully restricted position of valve portion 56 is shown in full lines in Fig. 6.

It will be evident that as a result of this invention a combined restrictor-swivel valve has been provided which eliminates the separate restrictors heretofore required in the hydraulic lines with a consequent reduction in weight while greater wing folding efficiency is gained.

With the prior fixed, or constant, restrictors the rate of movement of the movable wing sections throughout their entire range of angular movement was limited to the slow speed at which it was permissible for the sections to be moving at the end of their folding or extending movements. It will be evident that by providing variable restrictors which are operated in synchronism with the angular movements of the wing sections, it has been made possible to move the wing sections at the desired slow speed at the ends of their angular movements while greatly accelerating their movements throughout the major portion of the 135° angular path through which they move. As a result the time required to get an airplane into or out of action has been very materially reduced.

It will further be evident that by the combined restrictor-swivel valve construction of this invention these desirable results have been obtained while at the same time providing a simplified and considerably lighter hydraulic system for the actuation of the movable wing sections.

While only one embodiment has been shown herein for the purpose of fully disclosing the invention so that others may understand and obtain the advantages of the invention in practice, it will be understood that various changes may be made in the construction and arrangement of the parts without departing from the scope of the invention as defined in the claims. For example, the particular valve structure illustrates only one of numerous ways to construct a variable restrictor valve, and the valve could obviously be located on the fixed structure of the airplane remote from the hinge line of the wing and be operatively connected with the movable wing panel, or alternatively be located on the movable wing panel and be operatively connected with the relatively fixed airplane structure.

We claim:

1. In an airplane having a fuselage, a wing including an inboard panel rigidly mounted on said fuselage and a foldable outboard panel having a hinged support in the extremity of said inboard panel, means for folding and unfolding said outer panel including a hydraulic strut, means for supplying liquid under pressure to said strut including fluid lines, means for controlling the supply of fluid to said strut including a valve having relatively stationary and movable parts, one of which is carried by said outer panel, and means for moving said outer panel at different velocities in different parts of its range of movement including cooperating means on said parts for varying the rate of fluid flow through said lines to said valve in different angular positions of said outer panel.

2. In an airplane having a fuselage, a wing including an inboard panel rigidly mounted on said fuselage and a foldable outboard panel having a hinged support in the extremity of said inboard panel, means for folding and unfolding said outer panel including a hydraulic strut, means for supplying a liquid under pressure to said strut including fluid lines, means for controlling the supply of fluid to said strut including a valve located in the hinge lines of said outer panel having relatively stationary and movable parts, one of which is carried by said outer panel and means for moving said outer panel at different velocities in different parts of its range of movement including cooperating liquid throttling elements on said valve parts for varying the rate of fluid flow through said lines to said strut.

3. In an airplane having a fuselage, a wing including an inboard panel rigidly mounted on said fuselage and a foldable outboard panel having a hinged support at the extremity of said inboard panel, means for folding and unfolding said outer panel including a hydraulic strut, fluid connections for said strut, a selector valve for reversing the flow of fluid in said connections and swinging said outer panel in opposite directions, a restrictor-swivel valve in the hinge line of said outer panel having relatively stationary and movable elements, one of which elements is operatively connected to said outer panel, said restrictor-swivel valve having passages therein forming a part of said fluid connections, and means on said movable element of said latter valve for restricting the rate of fluid flow in said passages only when said outer panel approaches said folded or extended positions thereof.

4. In an airplane having a fuselage, a wing including an inboard panel rigidly mounted on said fuselage and a foldable outboard panel having a hinged support on the extremity of said inboard panel, hydraulically operated means including a hydraulic motor for swinging said outboard panel between extended and folded positions, a source of liquid under pressure, means for connecting said motor to said liquid source, a fluid restrictor valve in said connecting means comprising a stationary element carried by said inboard panel at said hinged support and a rotatable element having its axis of rotation coincident with the axis of said hinged support, means for operatively connecting said rotatable element with said outer panel, and cam means on said rotatable element providing for free liquid flow to said motor during the major portion of the range of movement of said movable panel and restricting said flow as said movable panel approaches its extended and folded positions.

5. In an airplane having a fuselage, a wing including an inboard panel rigidly mounted on said fuselage and a foldable outboard panel having a hinged support on the extremity of said inboard panel, hydraulically operated means including a hydraulic motor for swinging said outer panel between its extended and folded positions, a source of fluid pressure, fluid lines connecting said motor with said source of pressure and with drain, a restrictor-swivel valve in said fluid lines having the axis of its swivel located in the hinge line of said hinged support for controlling the flow of fluid in said lines as said outer panel approaches its extended and folded positions, said valve including a valve body carried by said inboard panel having passage means therein for connection to said fluid lines and a movable element having a pair of cams thereon, one of which is located in and controls each of said passage means, and means for operatively connecting said movable valve element with said outer panel.

6. In an airplane having a fuselage, a wing including an inboard panel mounted on said fuselage and a foldable outboard panel having a hinged support at the extremity of said inboard panel, means for folding and unfolding said outer panel including a hydraulic strut, fluid connections for said strut, a selector valve for reversing the flow of fluid in said connections and swinging said outer panel in opposite directions, obturator means carried by said inboard panel for progressively restricting the flow of fluid in said connections at a predetermined point during the folding and unfolding of said outer panel including a movable element operatively connected to said outer panel and comprising an eccentric groove cooperating with said fluid connections.

ARNOLD C. NEWMAN.
JOHN W. WOODWARD.

REFERENCES CITED

The following references are of record in the file of this patent:

UNITED STATES PATENTS

| Number | Name | Date |
|---|---|---|
| 1,064,847 | Mills | June 17, 1913 |
| 1,329,881 | Bloom | Feb. 3, 1920 |
| 2,162,233 | Schoenberger | June 13, 1939 |
| 2,284,994 | Stuckenholt | June 2, 1942 |
| 2,289,224 | Swanson et al. | July 7, 1942 |
| 2,290,850 | Umschwief | July 21, 1942 |
| 2,358,988 | Magrum | Sept. 26, 1944 |
| 2,376,636 | Thompson | May 22, 1945 |

FOREIGN PATENTS

| Number | Country | Date |
|---|---|---|
| 476,590 | Great Britain | Dec. 13, 1937 |